US006667742B2

(12) United States Patent
Noettling

(10) Patent No.: US 6,667,742 B2
(45) Date of Patent: Dec. 23, 2003

(54) PRESENTATION DEVICE

(75) Inventor: Alois Noettling, Pottenstein (DE)

(73) Assignee: Siemens Aktiengesellschaft, München (DE)

( * ) Notice: Subject to any disclaimer, the term of this patent is extended or adjusted under 35 U.S.C. 154(b) by 195 days.

(21) Appl. No.: 09/776,973

(22) Filed: Feb. 5, 2001

(65) Prior Publication Data

US 2001/0028349 A1 Oct. 11, 2001

(30) Foreign Application Priority Data

Feb. 4, 2000 (DE) .......................... 100 04 900

(51) Int. Cl.⁷ .............................. G06T 17/00
(52) U.S. Cl. ...................... 345/427; 345/850
(58) Field of Search ................. 345/419, 420, 345/424, 650, 653, 676, 679, 848, 850, 473, 474, 764, 976, 427; 128/920; 382/128; 702/27; 600/407; 711/169

(56) References Cited

U.S. PATENT DOCUMENTS 5,555,366 A  9/1996 Teig et al.
5,891,030 A  4/1999 Johnson et al.

OTHER PUBLICATIONS

Hong et al. "Virtual Voyage: Interactive Navigation in the Human Colon" SIGGRAPH 1997.*
You et al. "Interactive Volume Rendering for Virtual Colonoscopy" IEEE 1997.*
Wan et al. "Volume Rendering Based Interactive Navigation within the Human Colon" IEEE 1999.*
Chiou et al. "An Interactive Fly–Path Planning Using Potential Fields and Cell Decomposition for Virtual Endoscopy" IEEE 1999.*

* cited by examiner

Primary Examiner—Almis R. Jankus
(74) Attorney, Agent, or Firm—Schiff Hardin & Waite

(57) ABSTRACT

In a presentation device for two-dimensional, perspective projection of volume data elements of a volume dataset, the point of vision can be displaced along an optical axis and the point of vision and, with it, an acquired spatial angle can be rotated around at least one rotational axis with interactive inputs. The rotational axis intersects the optical axis in a pivot point that is determined dependent on the data values of volume data elements that lie within the acquired spatial angle, particularly on the optical axis or in the proximity thereof.

19 Claims, 4 Drawing Sheets

PRESENTATION DEVICE

BACKGROUND OF THE INVENTION

1. Field of the Invention

The present invention is directed to a presentation device for presenting a volume dataset with a number of volume data elements as a perspective, two-dimensional image rotatable around a basic rotational axis.

2. Description of the Prior Art

Devices of the above type are known which have a data memory for storing the volume dataset, a computer unit for determining the image from the volume data elements of the volume dataset, a display unit, for example a monitor, at least for the presentation of the image and at least one input means, for example a keyboard and/or a mouse control. In such devices, a position in the volume and a data value are allocated to each volume data element. A perspective, two-dimensional image covering a spatial angle is determined on the basis of the volume data elements, a point of vision and an optical axis containing the point of vision, and is presented via the display unit. The point of vision is displaceable along the optical axis on the basis of interactive inputs. The point of vision and, with it, the spatial angle that is covered are rotatable around a basic rotational axis on the basis of interactive inputs. The basic rotational axis intersects the optical axis at a basic intersection angle in a pivot point.

Such presentation devices are employed in medical fields for the presentation of tomograms or other three-dimensional reconstructions of patient images, for example in X-ray angiography. The above-described manner of employment is referred to as manual fly.

When the volume data elements represent a portion of a vessel system, for example a blood vessel system, the point of vision is placed in the inside of a vessel in the manual fly. The medical practitioner can then implement virtual endoscopy with the manual fly.

In the known devices, the basic rotational axis lies at a fixed distance from the point of vision. The requires a very dexterous interactive input on the part of the medical practitioner in order to alternately shift the point of vision along the optical axis and rotate the image and the point of vision around the basic rotational axis in common. If the medical practitioner is not very experienced or dexterous, he/she can only advance very slowly and laboriously in the vessel system. In the extreme case, there is even the risk that he/she will—virtually—puncture the vessel wall, no longer find the way back into the vessel system and must begin the virtual endoscopy anew. In practice, this has in minimal use of the manual fly option in presentation devices that offer the manual fly mode.

U.S. Pat. No. 5,555,366 discloses a computer graphics system for the selective model formation of molecules and researching chemical and physical properties. The two-dimensional and three-dimensional presentations of the molecules can be modified with the editing tools of the system, whereby the modifications are transferred into the other presentation.

U.S. Pat. No. 5,891,030 discloses a device that reproduces tubular structures of a human body, for example the gastrointestinal tract, with the assistance of a CT scanner with a work station. The center line of the large intestine is thereby identified. The work station compiles CT data such that axial tomograms, transluminal cross-sectional images and intraluminal volume rendering images are shown.

SUMMARY OF THE INVENTION

An object of the present invention is to provide a presentation device wherein a manual fly within a vessel system is enabled in a simple way so acceptance by the users, particularly medical practitioners, is thus improved.

The object is achieved in a presentation device wherein volume data elements within the spatial angle that is covered are selectable, and wherein the pivot point is defined dependent on the data values of the selected volume data elements.

As a result, the basic rotational axis can be positioned in a simple way so that it always lies within the vessel system. An inadvertent departure from the vessel system is no longer possible.

When the selected volume data elements lie on the optical axis or in the proximity thereof, the determination of the pivot point can ensue especially quickly. Generally, the data values of the volume data elements contain at least one transmission coefficient. It is therefore possible to determine an overall transmission from the point of vision to the respective, selected volume data element for the selected volume data elements, and to define the pivot point dependent on the overall transmission.

The evaluation can, for example, ensue so that those volume data elements are determined from the selected volume data elements for which the overall transmission exceeds or falls below a transmission limit. A terminal volume data element that lies closes to the point of vision is determined from these volume data elements, and the pivot point is defined on the basis of the terminal volume data element.

Alternatively, it is possible for the selected volume data elements to be checked for a truncate condition independently of one another, and a terminal volume data element that lies closest to the point of vision is determined from the selected volume data elements meeting the truncate condition. The pivot point is determined on the basis of the terminal volume data element. The truncate condition can, for example, be that the data value of the volume data element lies within a prescribable value range, for example between a lower barrier and an upper barrier.

The pivot point need not necessarily coincide with the position of the terminal volume data element but can be spaced therefrom by a distance.

When the pivot point lies between the terminal volume data element and the point of vision, the rotational axis in the manual fly always lies within the virtually endoscoped vessel.

In an embodiment wherein the spatial angle can be varied by interactive inputs, a more flexible manipulation of the presentation device is achieved.

When the pivot point is determined after every displacement of the point of vision, the user can divide a rotation into a number of partial rotations upon retention of the pivot point.

When the optical axis is laterally displaceable and the pivot point is also determined after every displacement of the optical axis, an even more flexible manipulation of the presentation device is achieved.

DESCRIPTION OF THE PREFERRED EMBODIMENTS

Figure 1:
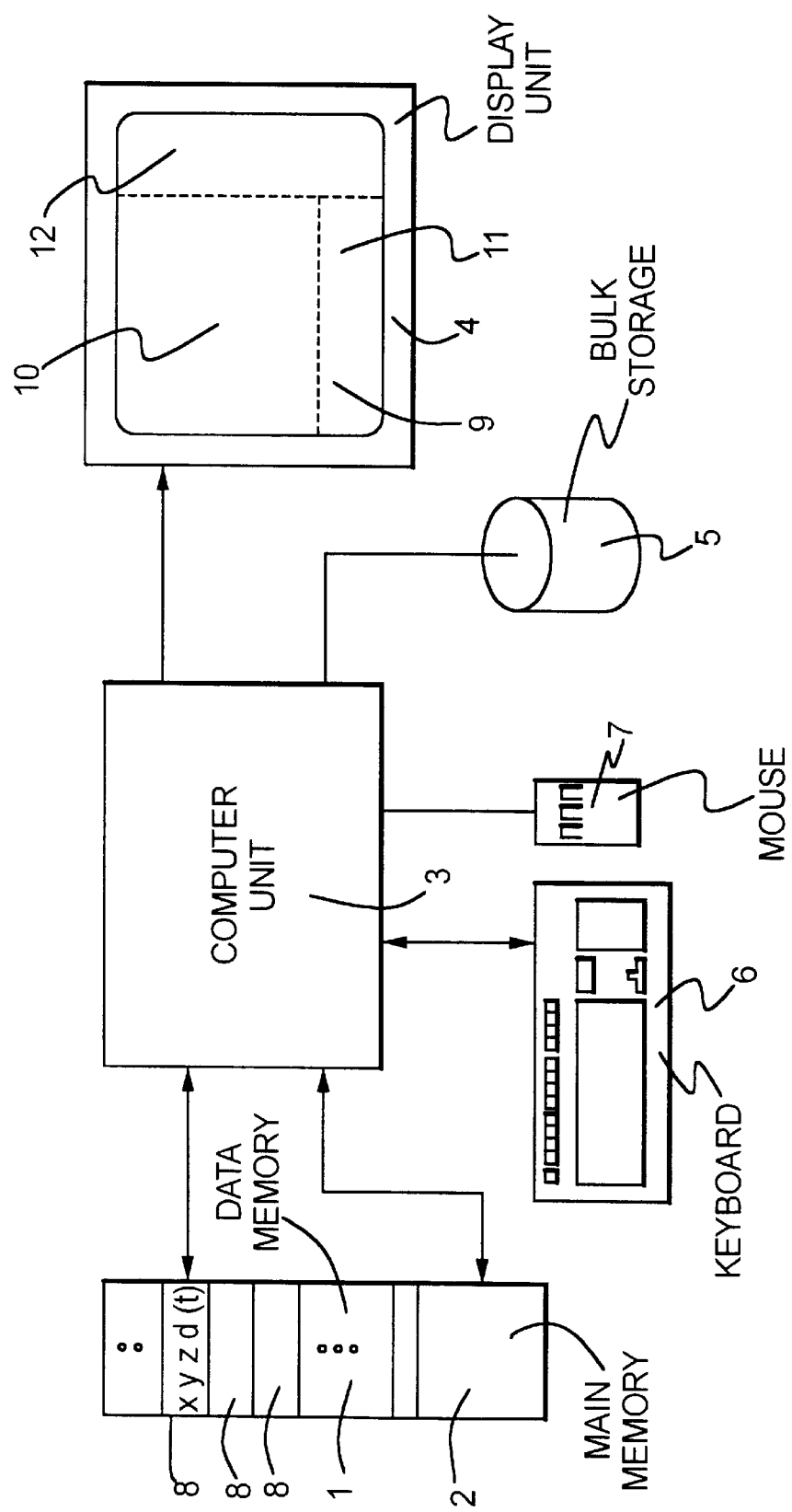
FIG. 1 is schematic block diagram of a presentation device constructed and operating in accordance with principles of the present invention.

As shown in FIG. 1, a presentation device has a data memory 1 and a main memory 2 that are connected to a computer unit 3. A display unit 4, a bulk storage 5 as well as input devices are also connected to the computer unit 3.

Figure 2:
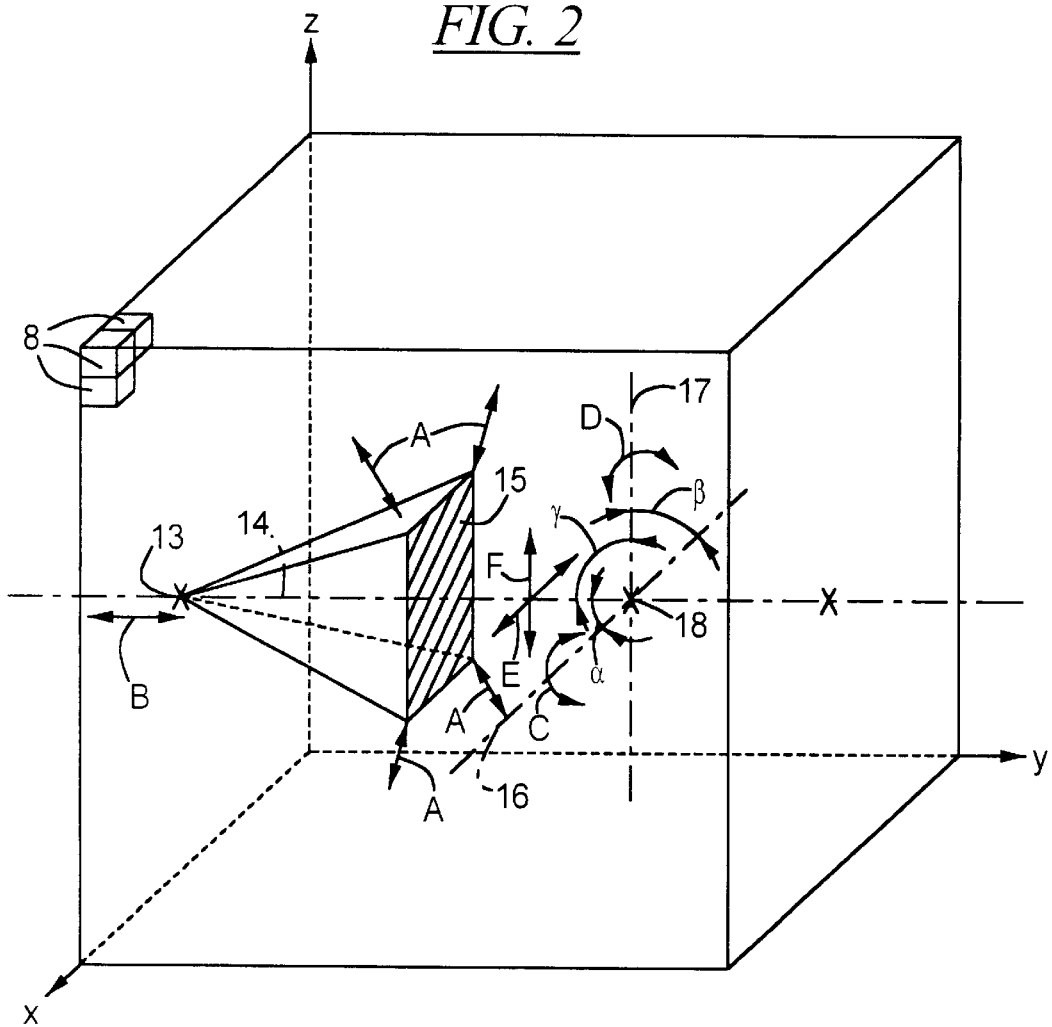
FIG. 2 illustrates a volume dataset for explaining the operation of the inventive presentation device.

A volume dataset is stored in the data memory 1. The volume dataset contains a number of volume data elements 8. Three coordinates x, y, z of a Cartesian coordinate system and a data value d are allocated to each volume data element 8. A position (x, y, z) in the volume is thus allocated to each volume data element 8 by the coordinates x, y and z. For clarity, only a few of the volume data elements 8 are shown in FIG. 2.

An operating system for the computer unit 3, application programs for the computer unit 3 and further data, for example image data for the display unit 4, are stored in the main memory 5.

The display unit 4 is usually a monitor. A two-dimensional image can be displayed via the display unit 4. The bulk storage 5 is usually fashioned as a hard disk. The input devices usually are a keyboard 6 and a mouse control 7. Control commands interactively input via the input devices are queried by the computer unit 3 and processed according to the application program running at the moment.

The volume dataset can be presented as a two-dimensional image on the display unit 4 with the application program. The computer unit 3 determines the image data corresponding thereto from the volume data elements 8 of the volume dataset. The identified image data, which in totality produce the two-dimensional image, are then presented on the display unit 4.

As shown in FIG. 1, the display unit 4 has an image region 9 that is in turn subdivided into three sub-regions 10 through 12. The sub-region 10 serves for the actual presentation of the two-dimensional image. A frequency of occurrence distribution (histogram) of the data values d is displayed in the sub-region 11. The sub-region 12 serves as a control panel. The two-dimensional image presented in the sub-region 10 is a perspective presentation, i.e., a projection of the volume data elements 8. In practice, the volume datasets are often self-identifiable. For example, they represent a body part of a human or of an animal.

As shown in FIG. 2, the volume data elements 8 as a whole form a volume. A point of vision 13 and an optical axis 14 are determined in the volume. Proceeding from the point of vision 13, one then looks, so to speak, into the volume along the optical axis 14. Those volume data elements 8 that lie within an acquired spatial angle 15 are then acquired. The spatial angle 15 is symmetrically arranged around the optical axis 14. This proceeds centrally with respect to the spatial angle 15 that is covered. The spatial angle 15 can be varied by interactive inputs. This is indicated in FIG. 2 with double arrows A.

A perspective, two-dimensional image is determined on the basis of the acquired volume data elements 8 and is presented via the display unit 4. The image that is presented is thus a perspective projection. The point of vision 13 can be displaced along the optical axis 14 with interactive inputs. The displaceability is indicated in FIG. 2 with a double arrow B.

The point of vision 13 and, with it, the spatial angle that is covered can, further, be rotated around a basic rotational axis 16 and around an auxiliary rotational angle 17 on the basis of interactive inputs. The rotatability is indicated in FIG. 2 with double arrows C and D. The rotational axes 16 and 17 and the optical axis 14 intersect in a common pivot point 18. They thereby form section angles $\alpha$, $\beta$, $\gamma$. The section angles $\alpha$, $\beta$, $\gamma$ each amount to 90° according to the exemplary embodiment.

The optical axis 14 and, with it, the point of vision 13, the pivot point 18 and the acquired spatial angle are also laterally displaceable, i.e. perpendicular to the optical axis 14. This is indicated with double arrows E and F in FIG. 2.

As shown in FIG. 2, the optical axis and the rotational axes 16 and 17 proceed parallel to the edges of the volume formed by the volume data elements 8. This illustration, however, is only an example. Arbitrary orientations are possible.

Figure 3:
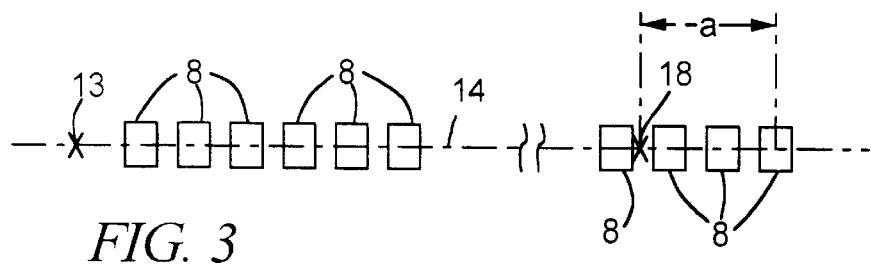
FIG. 3 schematically illustrates the arrangement of the volume data elements in the volume dataset in accordance with the invention.

The pivot point 18 is determined anew by the computer unit 3 after every displacement of the point of vision 13 along the optical axis 14 as well as after every lateral displacement of the optical axis 14. It remains unmodified, in contrast, after a pure rotation. The determination ensues dependent on the data values d of selected volume data elements 8. The selected volume data thereby lie within the spatial angle 15 that is covered. As shown in FIG. 3, only volume data elements 8 that lie on the optical axis 14 or in the immediate proximity thereof are interpreted.

A terminal volume data element 8 is determined from the volume data elements 8 that lie on the optical axis 14 or in the immediate proximity thereof. The determination of the terminal volume data element 8 shall be discussed in greater detail below. From the terminal volume data element 8, the point of vision 13 is approached by a distance 'a' on the optical axis 14. The location that is determined in this way then forms the pivot point 18 of optical axis 14 and rotational axes 16 and 17.

The pivot point 18 is thus spaced from the terminal volume data element 8 by a distance 'a' . It usually lies between the terminal volume data element 8 and the point of vision 13. The distance 'a' is thereby fixed. It thus remains unmodified given a redetermination of the pivot point 18.

As shown in FIG. 3, the procedure for determining the pivot point 18 is always the same. One initially begins with the volume data element 8 at the location of the point of vision 13. This volume data element 8 is first checked for the truncate condition. Proceeding from the point of vision 13, the volume data elements 8 that lie on the optical axis 14 or immediately next to it are then successively checked for the truncate condition. The volume data element 8 that is the first to satisfy the truncate condition is then the terminal volume data element 8; for example, it is the last voxel with transparency. The volume data element 8 that lies closest to the point of vision 13 and satisfies the truncate condition is thus always utilized as the terminal volume data element 8. The intersection 18 is then determined on the basis of this terminal volume data element 8.

It is possible to check the data values d of the volume data elements 8 on and immediately next to the optical axis 14 for the truncate condition independently of one another. For example, a check can be carried to determine whether the data values d lie within a specific value range.

As shown in FIG. 1, the data values d of the volume data elements 8 also contain a transmission coefficient t. It is therefore also possible to determine an overall transmission T from the point of vision 13 to the selected volume data element 8 for the volume data elements 8 on and immediately next to the optical axis 14, and to then determine the pivot point 18 dependent on the overall transmission T. For example, the terminal volume data element 8 can be defined by whether the overall transmission T reaches or falls below a transmission limit TG for the first time thereat.

The above-described procedure is explained again below in conjunction with FIG. 4.

Figure 4:
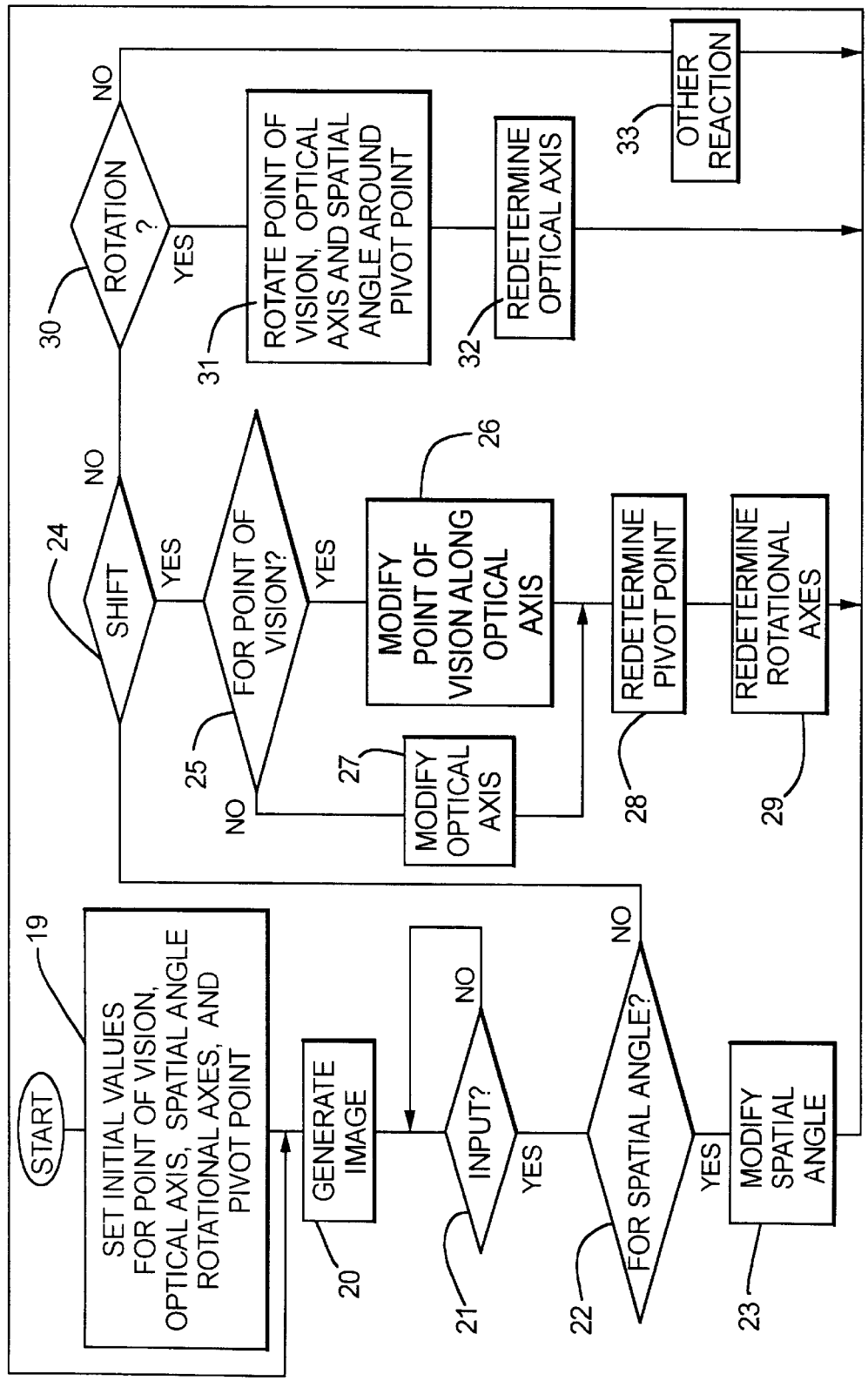
FIG. 4 is a flowchart showing the basic steps in the operation of the inventive presentation device.

As shown in FIG. 4, the point of vision 13, the optical axis 14, the spatial angle 15 as well as the pivot point 18 and—with it—the rotational axes 16 and 17 are set to initial values in a step 19. An image produced with these values is then determined in a step 20 and displayed in the sub-region 12. Whether an interactive input has ensued is continuously checked in a step 21.

When an input has ensued, then a check is made in a step 22 as to whether this input is intended to effect a modification of the spatial angle 15 to be covered. When this is so, the spatial angle 15 is modified in a step 25 and a branch is subsequently made back to step 20.

Otherwise, a check is made in a step 24 as to whether a shift is to ensue due to the input. When this is so, a check is made in a step 25 as to whether the point of vision 13 is to be displaced along the optical axis 14 as a result of the input. When this is so, this displacement is implemented in a step 27. Otherwise, a lateral displacement of the optical axis 14 is undertaken in a step 27. In both instances, a redetermination of the pivot point 18 is implemented in a step 28. In a step 29, the two rotational axes are then redetermined. A branch is then made back to the step 20.

Even when a displacement was not prescribed, a check is made next in a step 30 as to whether a rotate instruction was entered. When this is so, the point of vision 13 and, with it, the optical axis 14 and the covered spatial angle 15 are rotated around the pivot point 18 in a step 31. The optical axis 14, which is defined by the point of vision 13 and the pivot point 18, is then redetermined in a step 32. Further, the two rotational axes 16 and 17 are redetermined in the step 32. A branch is then made back to the step 20.

Even when no rotation instruction was entered, some other reaction is made in a step 33 and a branch is possibly made back to the step 20.

Figure 5:
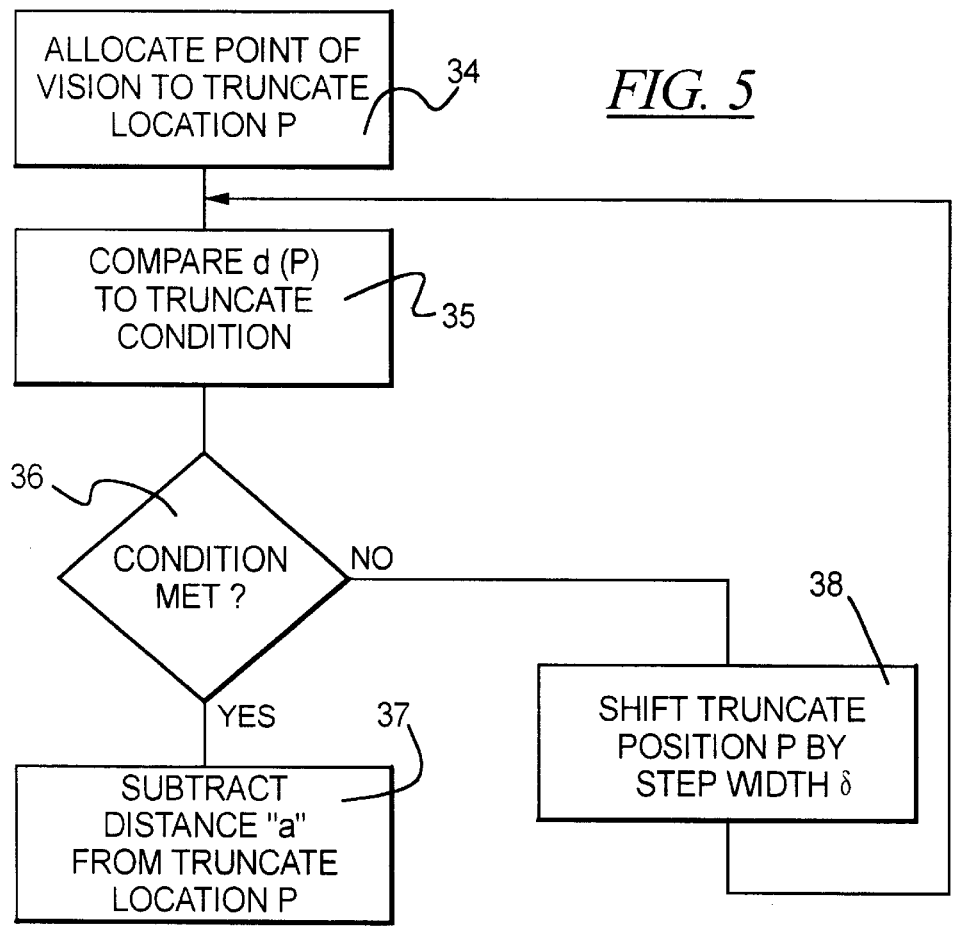
FIG. 5 shows details of a sub-routine in the flowchart of FIG. 4.

According to FIG. 5, the redetermination of the pivot point according to step 28 can ensue, for example, in that the point of vision 13 is initially allocated to a truncate location P in a step 34. The data value d of the truncate location P is then compared to the truncate condition in a step 35. A check is then carried out in a step 36 as to whether the truncate condition is met. When the truncate condition is met, the distance 'a' is subtracted from the truncate location in a step 37, and the value that thus derives is allocated to the pivot point 18. Otherwise, the truncate location P is shifted a step width δ along the optical axis 14 in a step 38 and a branch is made back to the step 35.

Figure 6:
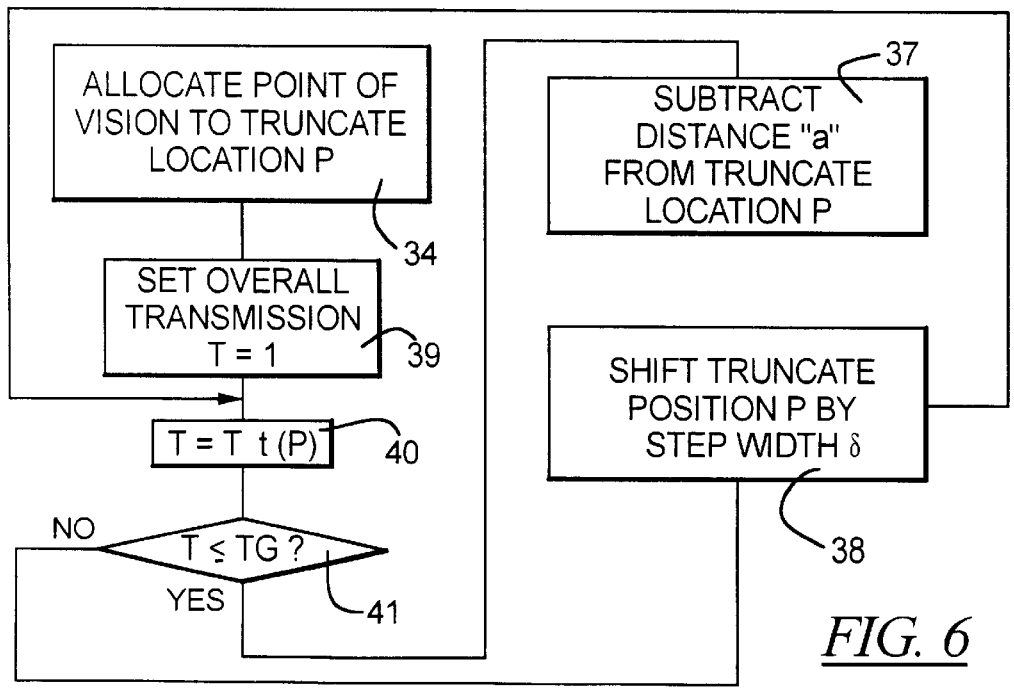
FIG. 6 is an alternative version of the sub-routine shown in FIG. 5.

FIG. 6 shows a modification of FIG. 5. The steps 34, 37 and 38 are identical to those of FIG. 5. According to step 39, however, the overall transmission T is first set to the value 1. In the step 40, the overall transmission T is multiplied by the transmission t at the truncate location P. In the step 41, a check is then made to determine whether the overall transmission T has reached or fallen below the transmission limit TG. Dependent on the result of this check, a branch is then made to one of the steps 37 and 38.

The inventive presentation device enables a manual fly within a vessel system with distance from the subject in a simple way, whereby the pivot point 18 of the rotation lies on the subject.

Although modifications and changes may be suggested by those skilled in the art, it is the intention of the inventor to embody within the patent warranted hereon all changes and modifications as reasonably and properly come within the scope of his contribution to the art.

I claim as my invention:

1. A presentation device comprising:
   a data memory for storing a volume dataset, representing a volume, comprising a plurality of volume data elements, each of said volume data elements having a volume position and a data value allocated thereto, said volume position designating a position in said volume of that volume data element;
   a computer for generating a perspective, two-dimensional image of said volume from said volume dataset, said image covering a spatial angle and having a point of vision on an optical axis;
   a display connected to said computer for displaying said image;
   an input unit connected to said computer for entering first interactive inputs to said computer to display said point of vision along said optical axis, and for entering second interactive inputs into said computer for rotating said point of vision, and therewith said spatial angle, around a basic rotational axis, said basic rotational axis intersecting said optical axis at a basic intersection angle in a pivot point; and
   said computer automatically selecting volume data elements within said spatial angle, as selected volume data elements, and determining said pivot point dependent on the respective data values of the selected volume data elements.

2. A presentation device as claimed in claim 1 wherein said computer selects volume data elements on or approximate said optical axis as said selected volume data elements.

3. A presentation device as claimed in claim 1 wherein each data value of each volume data element contains a transmission coefficient, and wherein said computer, for each of said selected volume data elements, determines an overall transmission from said point of vision to the respective selected volume data element, and determines said pivot point dependent on said overall transmission.

4. A presentation device as claimed in claim 3 wherein said computer determines a transmission limit from said selected volume data elements and compares the overall transmission for each of said selected volume data elements to said transmission limit to obtain a subset of said selected volume data elements which respectively have an overall transmission that is less than or equal to said transmission limit, and wherein said computer identifies a terminal volume data element in said subset that lies closest to said point of vision and determines said pivot point dependent on said terminal volume data element.

5. A presentation device as claimed in claim 4 wherein said computer determines said pivot point as a point spaced a distance from said terminal volume data element.

6. A presentation device as claimed in claim 5 wherein said computer determines said pivot point as a point between said terminal volume data element and said point of vision.

7. A presentation device as claimed in claim 6 wherein said computer successively re-determines said pivot point dependent on said interactive inputs, but uses said distance unmodified in each re-determination of said pivot point.

8. A presentation device as claimed in claim 1 wherein said computer identifies a truncate condition and determines whether the respective data values of the selected volume data elements independently satisfy said truncate condition and identifies a subset of said selected volume data elements which satisfies said truncate condition, and determines a terminal volume data element that lies closest to said point of vision from said subset, and wherein said computer determines said pivot point dependent on said terminal volume data element.

9. A presentation device as claimed in claim 8 wherein said computer determines said pivot point as a point spaced a distance from said terminal volume data element.

10. A presentation device as claimed in claim 9 wherein said computer determines said pivot point as a point between said terminal volume data element and said point of vision.

11. A presentation device as claimed in claim 9 wherein said computer successively re-determines said pivot point dependent on said interactive inputs, but uses said distance unmodified in each re-determination of said pivot point.

12. A presentation device as claimed in claim 1 wherein said input unit provides further interactive inputs to said computer for varying said spatial angle.

13. A presentation device as claimed in claim 1 wherein said input unit also provides interactive inputs to said computer for rotating said point of vision, together with said spatial angle, around an auxiliary rotational axis, said auxiliary rotational axis intersecting said optical axis and said basic rotational axis at respective auxiliary section angles in said pivot point.

14. A presentation device as claimed in claim 13 wherein said basic section angle is 90°.

15. A presentation device as claimed in claim 14 wherein said auxiliary section angles are each 90°.

16. A presentation device as claimed in claim 1 wherein said basic section angle is 90°.

17. A presentation device as claimed in claim 1 wherein said optical axis proceeds centrally relative to said spatial angle.

18. A presentation device as claimed in claim 1 wherein said computer re-determines said pivot point after each displacement of said point of vision.

19. A presentation device as claimed in claim 1 wherein said first interactive inputs laterally displace said optical axis, and wherein said computer re-determines said pivot point after each displacement of said optical axis.

* * * * *